(12) United States Patent
Brummel et al.

(10) Patent No.: US 7,502,538 B2
(45) Date of Patent: Mar. 10, 2009

(54) SYSTEM TO MONITOR A STRUCTURE WITHIN AN OUTER CASING OF A GAS TURBINE ENGINE

(75) Inventors: Hans-Gerd Brummel, Berlin (DE); Evangelos V. Diatzikis, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 11/818,326

(22) Filed: Jun. 14, 2007

(65) Prior Publication Data

US 2008/0310804 A1 Dec. 18, 2008

(51) Int. Cl.
*G02B 6/04* (2006.01)
*G02B 6/26* (2006.01)
*G02B 6/00* (2006.01)

(52) U.S. Cl. .................. 385/120; 385/12; 385/115; 385/138; 250/227.11; 250/227.2; 250/578.1; 250/234; 250/235; 250/239

(58) Field of Classification Search ................ 385/120; 250/227.24, 236
See application file for complete search history.

(56) References Cited

U.S. PATENT DOCUMENTS

| | | | | |
|---|---|---|---|---|
| 4,092,537 A * | 5/1978 | Stewart | .......... | 378/51 |
| 4,657,385 A * | 4/1987 | Pointer | .......... | 356/43 |
| 5,148,667 A * | 9/1992 | Morey | .......... | 60/779 |
| 5,248,881 A * | 9/1993 | Kaminaga et al. | ...... | 250/227.21 |
| 5,644,394 A | 7/1997 | Owens | | |
| 5,978,525 A * | 11/1999 | Shu et al. | .......... | 385/12 |
| 6,285,449 B1 | 9/2001 | Ellingson et al. | | |
| 6,553,174 B2 * | 4/2003 | Winer | .......... | 385/137 |
| 6,599,028 B1 * | 7/2003 | Shu et al. | .......... | 385/80 |
| 6,978,074 B2 * | 12/2005 | Shu et al. | .......... | 385/137 |
| 6,992,315 B2 | 1/2006 | Twerdochlib | | |
| 2003/0056595 A1 | 3/2003 | Harrold et al. | | |
| 2005/0073673 A1 | 4/2005 | Devitt et al. | | |
| 2005/0156110 A1 * | 7/2005 | Crawely | ........... | 250/338.1 |
| 2005/0270519 A1 | 12/2005 | Twerdochlib | | |
| 2006/0078193 A1 | 4/2006 | Brummel et al. | | |
| 2006/0088793 A1 | 4/2006 | Brummel et al. | | |

OTHER PUBLICATIONS

U.S. Appl. No. 11/784,152, Diatzikis.

\* cited by examiner

*Primary Examiner*—Frank G Font
*Assistant Examiner*—Ryan Lepisto (57) ABSTRACT

A system is provided to monitor a structure within an outer casing of a gas turbine engine. The system may comprise an optical fiber bundle, a fiber bundle palette and a camera palette assembly. The optical fiber bundle may have first and second ends. The first end is adapted to pass through a bore in the outer casing of the gas turbine engine so as to be positioned adjacent the structure within the gas turbine engine casing to be monitored. The fiber bundle palette is adapted to be located outside of the engine casing to receive the second end of the optical fiber bundle. The camera palette assembly comprises a fixture movable relative to the fiber bundle palette and a first camera mounted to the fixture. The first camera is adapted to be positioned adjacent to the second end of the optical fiber bundle so as to receive electromagnetic radiation received by the first end of and transmitted through the optical fiber bundle.

20 Claims, 4 Drawing Sheets

SYSTEM TO MONITOR A STRUCTURE WITHIN AN OUTER CASING OF A GAS TURBINE ENGINE

FIELD OF THE INVENTION

The present invention relates to a system to monitor a structure within an outer casing of a gas turbine engine.

BACKGROUND OF THE INVENTION

Thermal barrier coatings (TBCs) applied to turbine airfoils are well known in the art for protecting parts such as blades and vanes from elevated operating temperatures within a gas turbine engine. However, TBCs are subject to degradation over their service life, and need to be inspected periodically to assess the integrity of the coating. Further, inspection of cooling ducts/openings in turbine airfoils is needed.

Other components within a gas turbine engine also need to be periodically inspected, such as vanes and blades in a compressor of the gas turbine engine for cracks or surface damage. It is also necessary to inspect the locations where the compressor vanes are coupled to a vane carrier to make sure the vanes are properly seated. Inspection of other gas turbine engine components such as combustor baskets is also required.

In the past, inspection of gas turbine engine components has been performed by partially disassembling the turbine engine and performing visual inspections on individual components. In-situ visual inspections may be performed without engine disassembly by using a borescope inserted into the turbine engine, but such procedures are labor intensive, time consuming, and require that the gas turbine engine be shut down, and the rotating parts held stationary for the inspection. Other inspections techniques have also been proposed, such as those disclosed in U.S. Pat. No. 6,992,315 and Patent Application Publication Nos. U.S. 2006/0078193 A1 and U.S. 2006/0088793 A1, the entire disclosure of each of these published patent and applications is hereby incorporated by reference herein.

An improved system for monitoring components within a gas turbine engine is desired.

SUMMARY OF THE INVENTION

In accordance with a first aspect of the present invention, a system is provided to monitor a structure within an outer casing of a gas turbine engine. The system may comprise an optical fiber bundle, a fiber bundle palette and a camera palette assembly. The optical fiber bundle may have first and second ends. The first end is adapted to pass through a bore in the outer casing of the gas turbine engine so as to be positioned adjacent the structure within the gas turbine engine casing to be monitored. The fiber bundle palette is adapted to be located outside of the engine casing to receive the second end of the optical fiber bundle. The camera palette assembly comprises a fixture movable relative to the fiber bundle palette and a first camera mounted to the fixture. The first camera is adapted to be positioned adjacent to the second end of the optical fiber bundle so as to receive electromagnetic radiation received by the first end of and transmitted through the optical fiber bundle.

The camera palette assembly may further comprise a second camera. The fixture is movable so as to position the first camera or the second camera adjacent to the second end of the optical fiber bundle.

The optical fiber bundle may comprise a plurality of low temperature optical fibers. One of the first and second cameras may be capable of receiving and processing electromagnetic radiation falling within the visible wavelength range. The one camera may comprise a high speed camera.

One of the first and second cameras may be capable of receiving and processing electromagnetic radiation falling within the near infrared wavelength range.

The optical fiber bundle may comprise a plurality of sapphire optical fibers capable of being used in a high temperature environment.

The optical fiber bundle may comprise a plurality of photonic crystal fibers. Each of the photonic crystal fibers may include a plurality of glass capillaries. The glass capillaries may be formed into a shape of a fiber having a hollow center through which electromagnetic radiation is transmitted. The glass capillaries of each of the photonic crystal fibers may comprise sapphire capillaries.

In accordance with a second aspect of the present invention, a system is provided for monitoring one or more structures within an outer casing of a gas turbine engine. The system may comprise first and second optical fiber bundles, a fiber bundle palette and a camera palette assembly. The first optical fiber bundle has first and second ends. The first end of the first optical fiber bundle is adapted to pass through a bore in the outer casing of the gas turbine engine. The second optical fiber bundle has first and second ends. The first end of the second optical fiber bundle is adapted to pass through a bore in the outer casing of the gas turbine engine. The fiber bundle palette is adapted to be located outside of the engine casing to receive the second end of the first optical fiber bundle and the second end of the second optical fiber bundle. The camera palette assembly may comprise a fixture positioned adjacent to the fiber bundle palette and a first camera mounted to the fixture. The first camera is adapted to be positioned adjacent to the second end of one of the first optical fiber bundle and the second optical fiber bundle so as to receive electromagnetic radiation transmitted by the one optical fiber bundle.

The first end of the first optical fiber bundle and the first end of the second optical fiber bundle are adapted to pass through a same bore in the outer casing of the gas turbine engine.

The fixture may be movable relative to the fiber bundle palette such that the first camera can be moved back and forth between a first position adjacent to the second end of the first optical fiber bundle and a second position adjacent to the second end of the second optical fiber bundle. The first camera receives electromagnetic radiation transmitted by the first optical fiber bundle when located in the first position and receives electromagnetic radiation transmitted by the second optical fiber bundle when located in the second position.

The camera palette assembly may further comprise a second camera mounted to the fixture. The first camera may be movable to a position adjacent to the second end of one of the first and second optical fiber bundles so as to receive electromagnetic radiation transmitted by the one optical fiber bundle. The second camera may be movable to a position adjacent to the second end of the other of the first and second optical fiber bundles so as to receive electromagnetic radiation transmitted by the other optical fiber bundle.

The first camera may be capable of receiving and processing electromagnetic radiation falling within the wavelength range of from about 8 microns to about 12 microns.

The first camera may be capable of receiving and processing electromagnetic radiation falling within the visible wavelength range.

The first camera may be capable of receiving and processing electromagnetic radiation falling within the near infrared wavelength range.

The optical fiber bundle may comprise a plurality of photonic crystal fibers; a plurality of low temperature optical fibers; or a plurality of sapphire optical fibers.

DETAILED DESCRIPTION OF THE INVENTION

In the following detailed description of the preferred embodiment, reference is made to the accompanying drawings that form a part hereof, and which is shown by way of illustration, and not by way of limitation, a specific preferred embodiment in which the invention may be utilized and that changes may be made without departing from the spirit and scope of the present invention.

Figure 1:
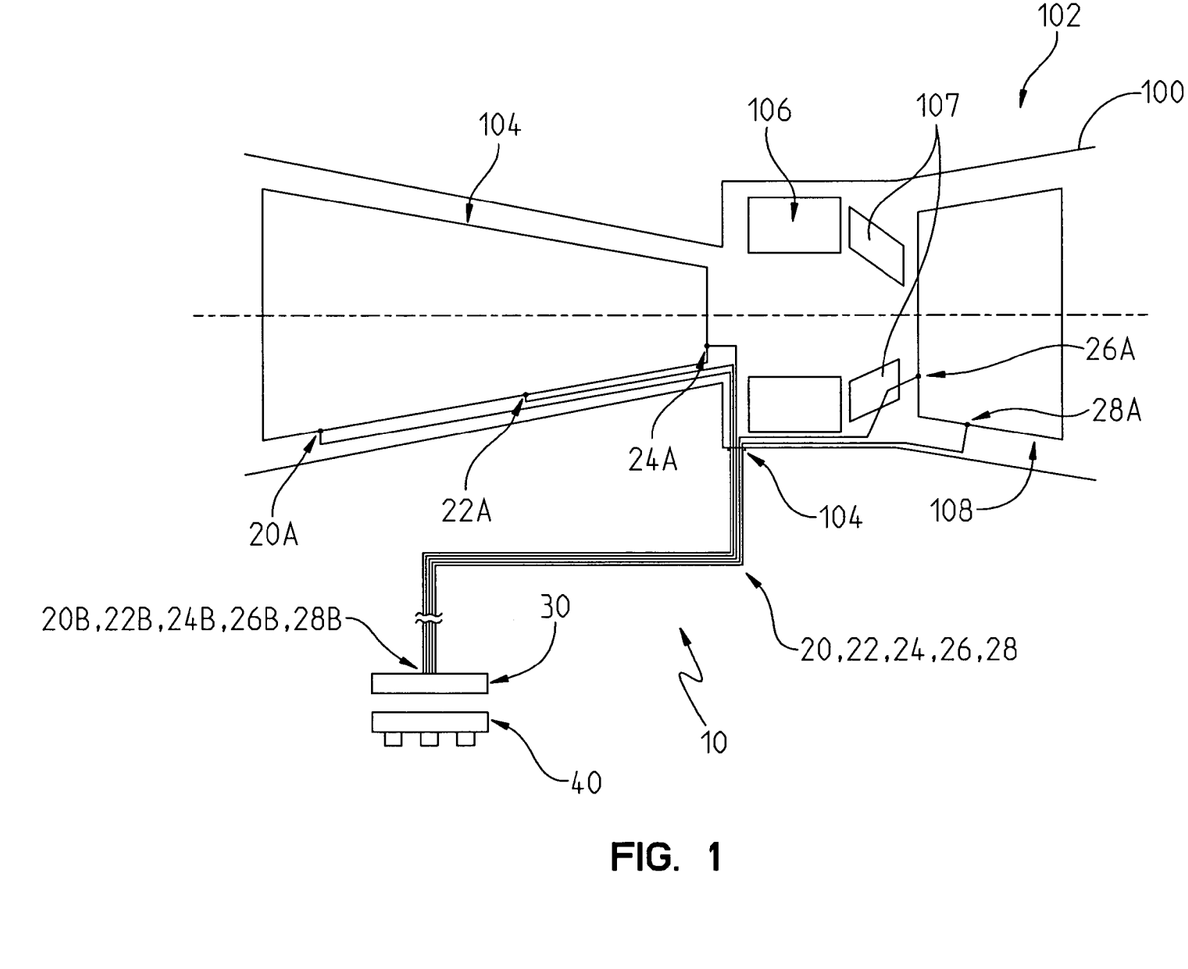
FIG. 1 is a schematic side view of a gas turbine engine and a monitoring system of the present invention.

Referring now to FIG. 1, a system 10 is illustrated for monitoring one or more structures within an outer casing 100 of a gas turbine engine 102, shown schematically in FIG. 1. In the illustrated embodiment, the gas turbine engine 102 includes a compressor 104, a combustor 106, and a turbine 108. The compressor 104 compresses ambient air. Within the compressor are a series of rows of stationary vanes and rotating blades (not shown). The combustor 106 combines the compressed air with a fuel and ignites the mixture creating combustion products defining a working gas. The working gases are routed from the combustor 106 via transition ducts 107 to the turbine 108. Within the turbine 108 are a series of rows of stationary vanes and rotating blades (not shown). Each pair of rows of vanes and blades is called a stage. Typically, there are four stages in a turbine 108. The rotating blades are coupled to a shaft and disc assembly (not shown). As the working gases expand through the turbine 108, the working gases cause the blades, and therefore the shaft and disc assembly, to rotate.

The monitoring system 10 of the present invention comprises one or more optical fiber bundles. In the embodiment illustrated in FIGS. 1-4, first, second, third, fourth and fifth optical fiber bundles 20, 22, 24, 26 and 28 are provided.

The first optical fiber bundle 20 comprises a plurality of low temperature telecommunication fibers collected together to form the first bundle 20 having a first entrance end 20A and a second exit end 20B, see FIGS. 1-4. The first fiber bundle 20 is capable of receiving electromagnetic radiation in the visible wavelength range of from about 0.4 microns to about 0.6 microns. The first optical fiber bundle 20 is capable of being employed in a low temperature environment, e.g., less than about 400 degrees C.

The second optical fiber bundle 22 is formed from a plurality of solid sapphire fibers collected together to form a fiber bundle having a first end 22A and a second end 22B. The third optical fiber bundle 24 is formed from a plurality of solid sapphire fibers collected together to form a fiber bundle having a first end 24A and a second end 24B. The fourth optical fiber bundle 26 is formed from a plurality of solid sapphire fibers collected together to form a fiber bundle having a first end 26A and a second end 26B. Each of the second, third and fourth optical fiber bundles 22, 24 and 26 is capable of receiving electromagnetic radiation falling within one or more of the following ranges: 1) visible wavelength range of from about 0.4 microns to about 0.6 microns; 2) near infrared wavelength range of from about 0.6 microns to about 1.6 microns; and 3) middle wavelength infrared wavelength range of from about 1.6 microns to about 8 microns. The second, third and fourth bundles 22, 24 and 26 are capable of being employed in a low temperature environment, where the temperature is less than about 400 degrees C. or a high temperature environment, where the temperature is between about 400 degrees C. and about 1200% degrees C.

Figure 2:
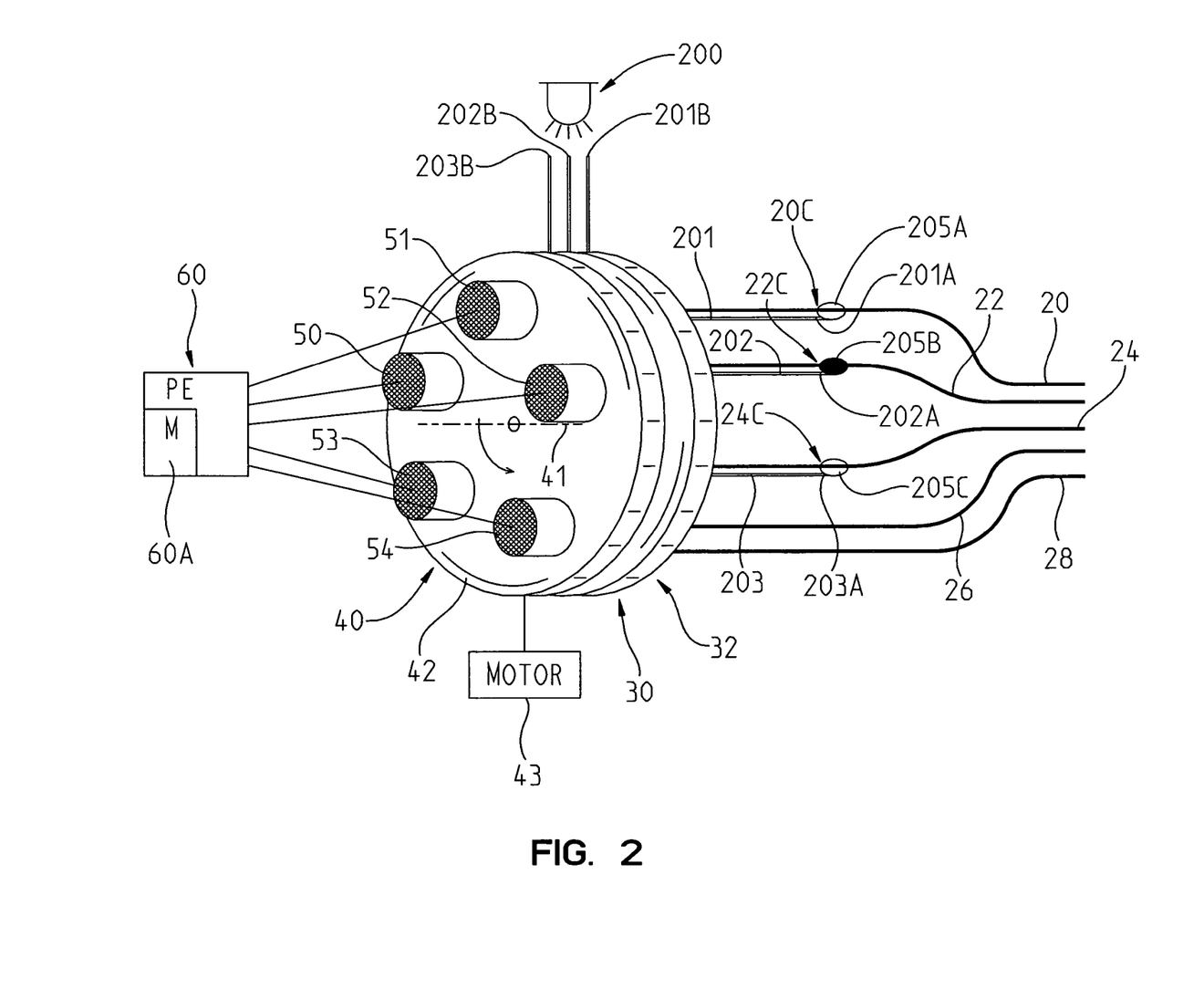
FIG. 2 is a schematic view of the monitoring system illustrated in FIG. 1.
Figure 3:
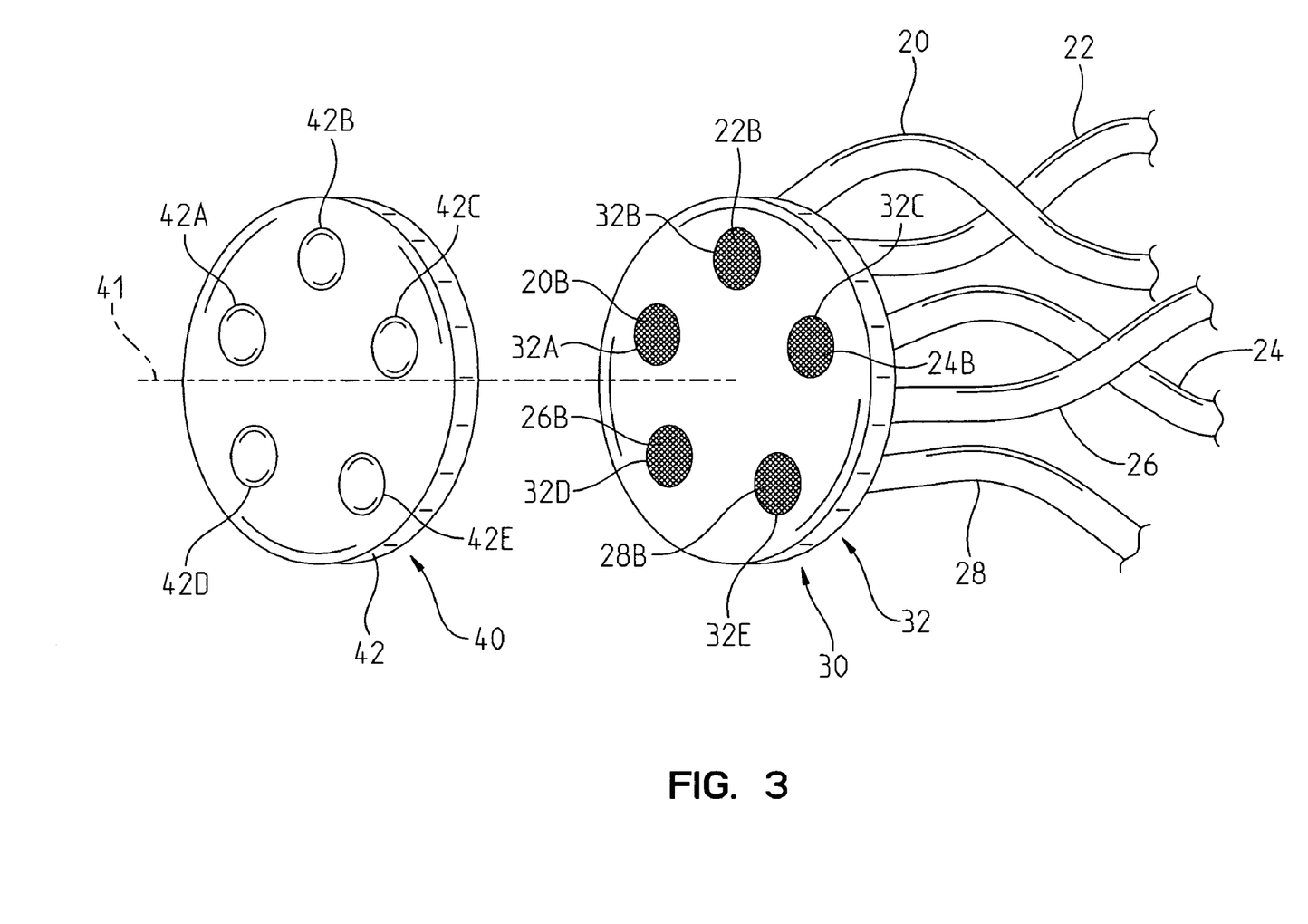
FIG. 3 is a schematic exploded view of a fiber bundle palette and camera palette of the monitoring system of FIG. 2.
Figure 4:
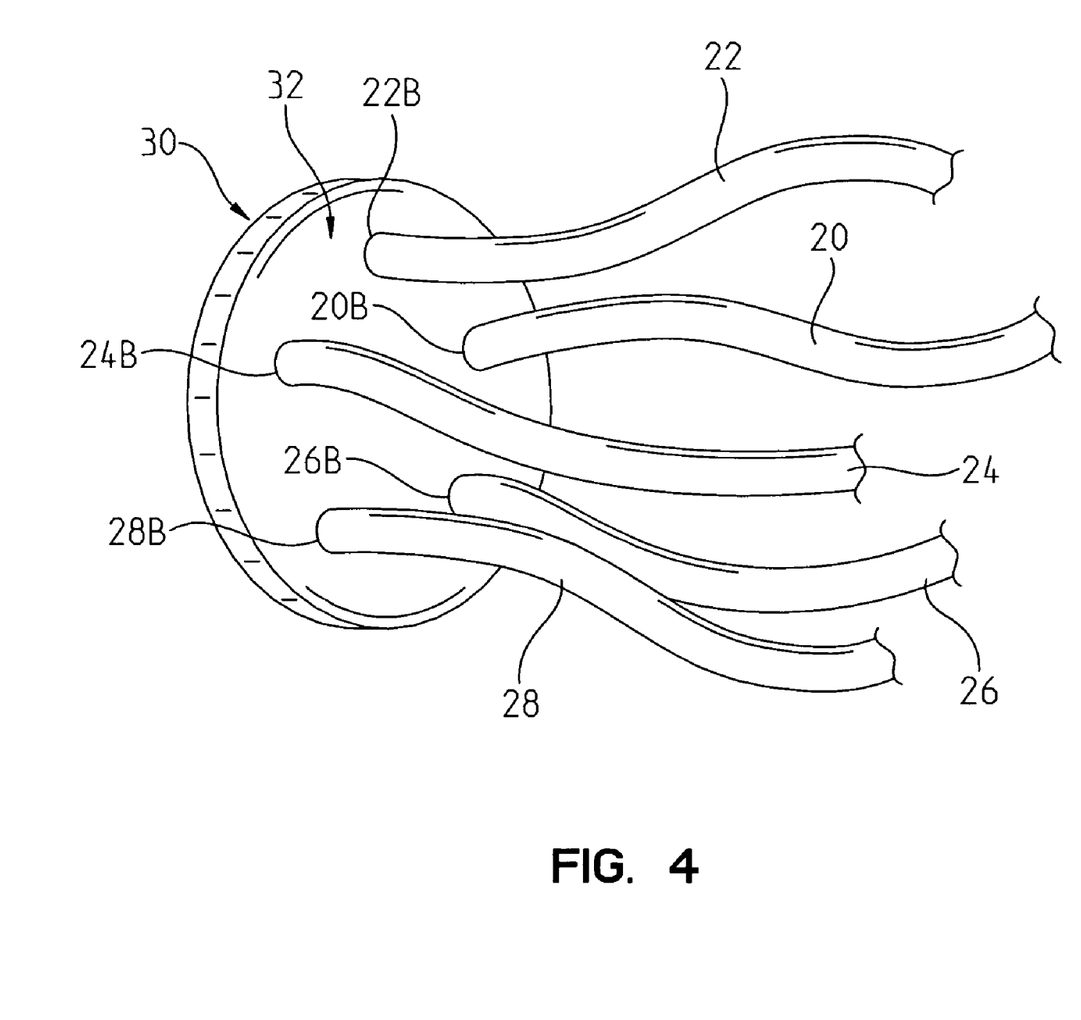
FIG. 4 is a view of a side of the fiber bundle palette opposite to the side illustrated in FIG. 3.

A visible light source 200 is provided outside of the engine casing 100, see FIG. 2. In the illustrated embodiment, sixth, seventh and eighth optical fiber bundles 201-203 are provided. The sixth optical fiber bundle 201 has a first end 201A and a second end 201B; the seventh optical fiber bundle 202 has a first end 202A and a second end 202B; and the eighth optical fiber bundle 203 has a first end 203A and a second end 203B.

The first end 201A of the sixth optical fiber bundle 201 is coupled to a first portion of the fibers forming the first optical fiber bundle 20 at a mid-section 20C of the first bundle 20 via a conventional coupling element 205A, see FIG. 2. The first end 202A of the seventh optical fiber bundle 202 is coupled to a first portion of the fibers forming the second optical fiber bundle 22 at a mid-section 22C of the second bundle 22 via a conventional coupling element 205B. The first end 203A of the eighth optical fiber bundle 203 is coupled to a first portion of the fibers forming the third optical fiber bundle 24 at a mid-section 24C of the third bundle 24 via a conventional coupling element 205C. The second ends 201B-203B of the sixth, seventh and eighth optical fiber bundles 201-203 are positioned adjacent to the visible light source 200. The sixth, seventh and eighth optical fiber bundles 201-203 may pass through a plate 32 of a fiber bundle palette 30, to be discussed below. Visible light received by the second ends 201B-203B of the sixth, seventh and eighth optical fiber bundles 201-203 from the light source 200 travels through the optical fiber bundles 201-203 and is provided to the first portions of the fibers of the first, second and third optical fiber bundles 20, 22 and 24. The visible light exits the first ends 20A, 22A and 24A of the first, second and third optical fiber bundles 20, 22 and 24 so as to illuminate structures, elements or parts within the engine casing 100 to be monitored.

The fifth optical fiber bundle 28 comprises a plurality of photonic crystal fibers arranged in a bundle having a first end 28A and a second end 28B. Each photonic crystal fiber used in the bundle 28 may comprise a plurality of solid sapphire filaments (which may also be referred to as solid capillaries) positioned to form an outer cladding surrounding a hollow core, as discussed in co-pending Patent Application U.S. Ser. No. 11/784,152 filed on Apr. 5, 2007, and entitled "MONITORING SYSTEM FOR TURBINE ENGINE," the entire disclosure of which is incorporated herein by reference. The fifth fiber bundle 28 is capable of receiving electromagnetic radiation in the long wavelength infrared wavelength range of from about 8 microns to about 12 microns. The electromagnetic radiation is received at the first end 28A of the fifth fiber bundle 28 and is guided by the bundle 28 to its second end 28B. The fifth optical fiber bundle 28 is capable of being employed in a high temperature environment having a temperature up to about 1200 degrees C.

The first ends 20A, 22A, 24A, 26A and 28A of the first, second, third, fourth and fifth optical fiber bundles 20, 22, 24, 26 and 28 are adapted to extend through one or more bores provided in the outer casing 100 of the gas turbine engine 102. In the illustrated embodiment, the first ends 20A, 22A, 24A, 26A and 28A of the first, second, third, fourth and fifth optical fiber bundles 20, 22, 24, 26 and 28 extend through a single bore 104 in the engine outer casing 100, see FIG. 1. The first ends 20A, 22A, 24A, 26A and 28A of the first, second, third, fourth and fifth optical fiber bundles 20, 22, 24, 26 and 28 are intended to remain within the engine casing 100 during operation, i.e., firing, of the engine 102.

The monitoring system further comprises a fiber bundle palette 30 and a camera palette 40. In the illustrated embodiment, both the fiber bundle palette 30 and the camera palette 40 are spaced away from the gas turbine engine 102 so as to be located in a low temperature environment, i.e., an environment where the temperature is less than about 40 degrees C.

The fiber bundle palette 30 comprises a plate 32 formed from wood, metal or a polymeric material. The fiber bundle palette plate 32 may be fixed relative to the engine 102 and the camera palette 40. The palette plate 32 includes first, second, third, fourth and fifth bores 32A-32E extending completely through the plate 32, see FIG. 3. The second end 20B of the first optical fiber bundle 20 is received in the first bore 32A; the second end 22B of the second optical fiber bundle 22 is received in the second bore 32B; the third end 24B of the third optical fiber bundle 24 is received in the third bore 32C; the fourth end 26B of the fourth optical fiber bundle 26 is received in the fourth bore 32D; and the fifth end 28B of the fifth optical fiber bundle 28 is received in the fifth bore 32E, see FIG. 3. Each of the second ends 20B, 22B, 24B, 26B and 28B of the first, second, third, fourth and fifth optical fiber bundles 20, 22, 24, 26 and 28 may be held within its corresponding bore 32A-32E via friction or a conventional adhesive.

In the illustrated embodiment, the camera palette 40 comprises a fixture 42 positioned near or in engagement with the fiber bundle palette plate 32. The camera palette fixture 42 is adapted to be rotated about an axis 41 via bearings or the like (not shown), see FIG. 2. A motor 43, which may be controlled by a controller (not shown), may be provided to effect controlled movement of the camera palette fixture 42 relative to the fiber bundle palette plate 32, see FIG. 2.

The camera fixture 42 is provided with first, second, third, fourth and fifth bores 42A-42E extending completely through the fixture 42. First, second, third, fourth and fifth cameras 50-55 are mounted to the fixture 42 via conventional mechanical connectors (not shown).

The first camera 50 is mounted to the fixture 42 so as to be capable of receiving electromagnetic radiation passing through the first bore 42A in the fixture 42. The fixture 42 may be rotated so that the first camera 50 and the fixture first bore 42A are positioned adjacent to and in alignment with the second end 20B of the first optical fiber bundle 20 located in the first bore 32A in the fiber bundle palette plate 32. When the first camera 50 and the fixture first bore 42A are positioned near and in alignment with the second end 20B of the first optical fiber bundle 20, electromagnetic radiation exiting the second end 20B of the first optical fiber bundle 20 passes through fixture first bore 42A and is received by the first camera 50. The first camera 50 may comprise a still camera, a video camera or function as both a still and a video camera. The first camera 50 is capable of recording electromagnetic radiation in the visible wavelength range of from about 0.4 microns to about 0.6 microns.

In the illustrated embodiment, the first end 20A of the first optical fiber bundle 20 is located near a front portion of the compressor 104, where the temperature is typically less than about 400 degrees C., see FIG. 1. For example, the first end 20A of the first optical fiber bundle 20 is positioned adjacent to a static structure, element or part(s) within the engine casing 100 located in the front portion of the compressor 104. The static structure, element or part(s) may comprise a vane or a plurality of vanes in one of the first four rows of vanes in the compressor 104. As noted above, visible light received by the second end 201B of the sixth optical fiber bundle 201 from the light source 200 travels through the optical fiber bundle 201 and is provided to the first portion of the fibers of the first optical fiber bundle 20. The visible light exits the first end 20A of the first optical fiber bundle 20 so as to illuminate the static structure, element or part(s) in the front portion of the compressor 104 being monitored, which monitoring operation may occur during operation, i.e., firing, of the gas turbine engine 102. Preferably during operation of the gas turbine engine 102, electromagnetic radiation is reflected from the structure, element or part(s) in the front portion of the compressor 104 being monitored and received by the first end 20A of the first optical fiber bundle 20. The received electromagnetic radiation travels through a remaining second portion of the fibers forming the first optical fiber bundle 20 and exits the bundle 20 through its second end 20B. The first camera 50 receives the electromagnetic radiation exiting the second end 20B of the first optical fiber bundle 20. Processing equipment 60 including one or more monitors 60A is coupled to the camera 50 for receiving image signals from the camera 50 and displaying a viewable visible image of the structure, element or part(s) positioned adjacent to the first end 20A of the first optical fiber bundle 20, see FIG. 2. For example, a technician may monitor a visible image of a vane or vanes during operation, i.e., firing, of the gas turbine engine 102 to determine if the vane(s) has been damage by a foreign object passing through the compressor 104 or is improperly seated in a vane carrier structure.

While not illustrated, conventional visible light optics may be attached to the first end 20A of the first optical fiber bundle 20 to provide a deeper field of view, a wider field of view or magnification of the structure, element or part(s) being monitored. Also, a conventional visible light focusing lens or lens system (not shown) may be provided at or near the second end 20B of the first optical fiber bundle 20 to focus the electromagnetic radiation exiting the second end 20B onto the first camera 50.

It is also contemplated that the first camera 50 may comprise a high speed video or still camera capable of imaging at a rate of about 250,000 images or frames per second. In this embodiment, the first end 20A of the first optical fiber bundle 20 may be positioned next to a moving part, such as a blade, or a static part, such as a vane. The high speed camera may be used to monitor vibrations of the blade or the vane or the movement of high temperature working gases flowing over the blade or the vane during operation, i.e., firing, of the gas turbine engine 102.

The second camera 51 is mounted to the fixture 42 so as to be capable of receiving electromagnetic radiation passing through the second bore 42B in the fixture 42. The fixture 42 may be rotated so that the second camera 51 and the fixture second bore 42B are positioned adjacent to and in line with the second end 22B of the second optical fiber bundle 22 located in the second bore 32B in the fiber bundle palette plate 32. When the second camera 51 and the fixture second bore 42B are positioned near the second end 22B of the second optical fiber bundle 22, electromagnetic radiation exiting the second end 22B of the second optical fiber bundle 22 passes through the fixture second bore 42B and is received by the second camera 51.

The third camera 52 is mounted to the fixture 42 so as to be capable of receiving electromagnetic radiation passing through the third bore 42C in the fixture 42. The fixture 42 may be rotated so that the third camera 52 and the fixture third bore 42C are positioned adjacent to and in line with the second end 24B of the third optical fiber bundle 24 located in the third bore 32C in the fiber bundle palette plate 32. When the third camera 52 and the fixture third bore 42C are positioned near the second end 24B of the third optical fiber bundle 24, electromagnetic radiation exiting the second end 24B of the third optical fiber bundle 24 passes through the fixture third bore 42C and is received by the third camera 52.

Each of the second and third cameras 51 and 52 may comprise a still camera, a video camera or function as both a still and a video camera. The second and third cameras 51 and 52 are capable of recording electromagnetic radiation in the near infrared wavelength range of from about 0.6 microns to about 1.6 microns.

In the illustrated embodiment, the first end 22A of the second optical fiber bundle 22 is located near a middle portion of the compressor 104, where the temperature is typically between about 200 degrees C. and about 300 degrees C., see FIG. 1. Further, the first end 24A of the third optical fiber bundle 24 is located near a rear portion of the compressor 104, where the temperature is typically about 450 degrees C. For example, the first end 22A of the second optical fiber bundle 22 may be positioned adjacent to a static structure, element or part(s) within the engine casing 100 located in the middle portion of the compressor 104. The first end 24A of the third optical fiber bundle 24 may be positioned adjacent to a static structure, element or part(s) within the engine casing 100 located in the rear portion of the compressor 104. The static structures, elements or parts in the middle and rear portions of the compressor 104 may comprise vanes.

As noted above, visible light received by the second ends 202B and 203B of the seventh and eighth optical fiber bundles 202 and 203 from the light source 200 travels through the optical fiber bundles 202 and 203 and is provided to the first portion of the fibers of the second and third optical fiber bundles 22 and 24. The visible light exits the first ends 22A and 24A of the second and third optical fiber bundles 22 and 24 so as to illuminate the static structures, elements or parts in the middle and rear portions of the compressor 104 being monitored, which monitoring operation may occur during operation, i.e., firing, of the gas turbine engine 102. Preferably during operation of the gas turbine engine 102, electromagnetic radiation is reflected from the structures, elements or parts in the middle and rear portions of the compressor 104 and received by the first ends 22A and 24A of the second and third optical fiber bundles 22 and 24. The received electromagnetic radiation travels through a remaining second portion of the fibers forming each of the second and third optical fiber bundles 22 and 24 and exits the bundles 22 and 24 through their second ends 22B and 24B. The second camera 51 receives the electromagnetic radiation exiting the second end 22B of the second optical fiber bundle 22 and the third camera 52 receives the electromagnetic radiation exiting the second end 24B of the third optical fiber bundle 24. The processing equipment 60 is coupled to the cameras 51 and 52 for receiving image signals from the cameras 51 and 52 and displaying a viewable image of the structures, elements or parts positioned adjacent to the first ends 22A and 24A of the second and third optical fiber bundles 22 and 24.

While not illustrated, conventional near infrared wavelength optics may be attached to the first ends 22A and 24A of the second and third optical fiber bundles 22 and 24 to provide a deeper field of view, a wider field of view or magnification of the structures, elements or parts being monitored. Also, a conventional near infrared wavelength focusing lens or lens system may be provided at or near the second ends 22B and 24B of the second and third optical fiber bundles 22 and 24 to focus the electromagnetic radiation exiting the second ends 22B and 24B onto the second and third cameras 51 and 52.

The fourth camera 53 is mounted to the fixture 42 so as to be capable of receiving electromagnetic radiation passing through the fourth bore 42D in the fixture 42. The fixture 42 may be rotated so that the fourth camera 53 and the fixture fourth bore 42D are positioned adjacent to and in line with the second end 26B of the fourth optical fiber bundle 26 located in the fourth bore 32D in the fiber bundle palette plate 32. When the fourth camera 53 and the fixture fourth bore 42D are positioned near the second end 26B of the fourth optical fiber bundle 26, electromagnetic radiation exiting the second end 26B of the fourth optical fiber bundle 26 passes through the fixture fourth bore 42D and is received by the fourth camera 53.

The fourth camera 53 may comprise a still camera, a video camera or function as both a still and a video camera. The fourth camera 53 is capable of recording electromagnetic radiation in the middle wavelength infrared wavelength range of from about 1.6 microns to about 8 microns.

In the illustrated embodiment, the first end 26A of the fourth optical fiber bundle 26 is located near an entry portion of the turbine 108, where the temperature is typically greater than about 1000 degrees C., see FIG. 1. For example, the first end 26A of the fourth optical fiber bundle 26 is positioned adjacent to a static structure, element or part(s) within the engine casing 100 located in the entry portion of the turbine 108. The static structure, element or part(s) within the entry portion of the turbine 108 may comprise a vane or a plurality of vanes, each comprising a metal airfoil having a conventional thermal barrier coating bonded to the metal airfoil via a conventional bonding material.

Preferably during operation, i.e., firing, of the gas turbine engine 102, electromagnetic radiation in the middle wavelength infrared wavelength range of from about 1.6 microns to about 8 microns is emitted from the structure, element or part(s) in the entry portion of the turbine 108 and received by the first end 26A of the fourth optical fiber bundle 26. It is believed that the structure, element or part(s) will be of a sufficiently high temperature during operation of the gas turbine engine 102, during which monitoring preferably occurs, that light from an outside light source is not needed to illuminate the structure, element or part(s) being monitored. The received electromagnetic radiation travels through the fourth optical fiber bundle 26 and exits the bundle 26 through its second end 26B. The fourth camera 53 receives the electromagnetic radiation exiting the second end 26B of the fourth optical fiber bundle 26. The processing equipment 60 is coupled to the camera 53 for receiving image signals from the camera 53 and displaying a viewable rendering of the structure, element or part(s) positioned adjacent to the first end 26A. It is believed that a technician can monitor the condition of the bonding material bonding the thermal barrier coating material to the metal airfoil of a vane being monitored via the camera 53 which, as noted above, is capable of recording electromagnetic radiation in the middle wavelength infrared wavelength range.

While not illustrated, conventional middle wavelength infrared wavelength optics may be attached to the first end 26A of the fourth optical fiber bundle 26 to provide a deeper field of view, a wider field of view or magnification of the structures, elements or parts being monitored. Also, a conventional middle wavelength infrared wavelength focusing lens or lens system may be provided at or near the second end 26B of the fourth optical fiber bundle 26 to focus the electromagnetic radiation exiting the second end 26B onto the fourth camera 53.

The fifth camera 54 is mounted to the fixture 42 so as to be capable of receiving electromagnetic radiation passing through the fifth bore 42E in the fixture 42. The fixture 42 may be rotated so that the fifth camera 54 and the fixture fifth bore 42E are positioned adjacent to and in line with the second end 28B of the fifth optical fiber bundle 28 located in the fifth bore 32E in the fiber bundle palette plate 32. When the fifth camera 54 and the fixture fifth bore 42E are positioned near the second end 28B of the fifth optical fiber bundle 28, electromagnetic radiation exiting the second end 28B of the fifth optical fiber bundle 28 passes through the fixture fifth bore 42E and is received by the fifth camera 54.

The fifth camera 54 may comprise a still camera, a video camera or function as both a still and a video camera. The fifth camera 54 is capable of recording electromagnetic radiation in the long wavelength infrared wavelength range of from about 8 microns to about 12 microns.

In the illustrated embodiment, the first end 28A of the fifth optical fiber bundle 28 is located near a middle portion of the turbine 108, where the temperature is typically greater than about 1000 degrees C., see FIG. 1. For example, the first end 28A of the fifth optical fiber bundle 28 is positioned adjacent to a static structure, element or part(s) within the engine casing 100 located in the middle portion of the turbine 108. The static structure, element or part(s) within the middle portion of the turbine 108 may comprise a vane or a plurality of vanes, each comprising a metal airfoil having a conventional thermal barrier coating bonded to the metal airfoil via a conventional bonding material.

Preferably during operation of the gas turbine engine 102, electromagnetic radiation in the long wavelength infrared wavelength range of from about 8 microns to about 12 microns is emitted from the structure, element or part(s) in the middle portion of the turbine 108 and received by the first end 28A of the fifth optical fiber bundle 28. The received electromagnetic radiation travels through the fifth optical fiber bundle 28 and exits the bundle 28 through its second end 28B. The fifth camera 54 receives the electromagnetic radiation exiting the second end 28B of the fifth optical fiber bundle 28. The processing equipment 60 is coupled to the camera 54 for receiving image signals from the camera 54 and displaying a viewable thermal image of the structure, element or part(s) positioned adjacent to the first end 28A. It is contemplated that a technician can monitor the condition of the thermal barrier coating on the airfoil of a vane being monitored via the camera 54 which, as noted above, is capable of recording electromagnetic radiation in the long wavelength infrared wavelength range.

While not illustrated, conventional long wavelength infrared wavelength optics may be attached to the first end 28A of the fifth optical fiber bundle 28 to provide a deeper field of view, a wider field of view or magnification of the structures, elements or parts being monitored. Also, a conventional long wavelength infrared wavelength focusing lens or lens system may be provided at or near the second end 28B of the fifth optical fiber bundle 28 to focus the electromagnetic radiation exiting the second end 28B onto the fifth camera 54.

It is contemplated that the third camera 52 may not be provided. Since the second camera 51 is functionally equivalent to the third camera 52, the fixture 42 may be rotated back and forth so as to allow the second camera 51 to receive electromagnetic radiation from the second end 22B of the second optical fiber bundle 22 and at a different time from the second end 24B of the third optical fiber bundle 24.

It is contemplated that less than five cameras or more than five cameras may be coupled to the fixture 42.

It is also contemplated that each of one or more cameras may be rotated to different positions relative to the fiber bundle palette plate 32 so as to receive electromagnetic radiation from second ends of two or more optical fiber bundles. For example, a first camera may be rotated back and forth so as to receive electromagnetic radiation from a second end of one optical fiber bundle when the first camera is located at a first rotational position relative to the plate 32 and receive electromagnetic radiation from a second end of another optical fiber bundle when the first camera is located at a second rotational position relative to the plate 32.

It is further contemplated that two or more cameras may be rotated to receive electromagnetic radiation at different times from a same optical fiber bundle. For example, the fourth and fifth cameras 53 and 54 may be rotated back and forth to receive electromagnetic radiation at different times from the fourth optical fiber bundle 26.

While particular embodiments of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system to monitor a structure within an outer casing of a gas turbine engine comprising:
    an optical fiber bundle having first and second ends, said first end being adapted to pass through a bore in the outer casing of the gas turbine engine so as to be positioned adjacent the structure within the gas turbine engine casing to be monitored;
    a fiber bundle palette adapted to be located outside of the engine casing to receive said second end of said optical fiber bundle; and
    a camera palette assembly comprising a fixture movable relative to said fiber bundle palette and a first camera mounted to said fixture, said first camera being adapted to be positioned adjacent to said second end of said optical fiber bundle so as to receive electromagnetic radiation received by said first end of and transmitted through said optical fiber bundle.

2. The system of claim 1, wherein said camera palette assembly further comprises a second camera, said fixture being movable so as to position said first camera or said second camera adjacent to said second end of said optical fiber bundle.

3. The system of claim 2, wherein at least one of said first and second cameras is capable of receiving and processing electromagnetic radiation falling within the visible wavelength range.

4. The system of claim 3, wherein said optical fiber bundle comprises a plurality of low temperature optical fibers.

5. The system of claim 3, wherein said one camera comprises a high speed camera.

6. The system of claim 2, wherein at least one of said first and second cameras is capable of receiving and processing electromagnetic radiation falling within the near infrared wavelength range.

7. The system of claim 1, wherein said optical fiber bundle comprises a plurality of sapphire optical fibers capable of being used in a high temperature environment.

8. The system of claim 1, wherein said optical fiber bundle comprises a plurality of photonic crystal fibers, each of said photonic crystal fibers including a plurality of glass capillaries, said glass capillaries being formed into a shape of a fiber having a hollow center through which electromagnetic radiation is transmitted.

9. The system of claim 8, wherein said glass capillaries of each of said photonic crystal fibers comprise sapphire capillaries.

10. A system to monitor one or more structures within an outer casing of a gas turbine engine comprising:

a first optical fiber bundle having first and second ends, said first end of said first optical fiber bundle being adapted to pass through a bore in the outer casing of the gas turbine engine;

a second optical fiber bundle having first and second ends, said first end of said second optical fiber bundle being adapted to pass through a bore in the outer casing of the gas turbine engine;

a fiber bundle palette adapted to be located outside of the engine casing to receive said second end of said first optical fiber bundle and said second end of said second optical fiber bundle; and a camera palette assembly comprising a fixture positioned adjacent to said fiber bundle palette and a first camera mounted to said fixture, said first camera being adapted to be positioned adjacent to said second end of one of said first optical fiber bundle and said second optical fiber bundle so as to receive electromagnetic radiation transmitted by said one optical fiber bundle.

11. The system of claim 10, wherein said first end of said first optical fiber bundle and said first end of said second optical fiber bundle are adapted to pass through a same bore in the outer casing of the gas turbine engine.

12. The system of claim 10, wherein said fixture is movable relative to said fiber bundle palette such that said first camera can be moved back and forth between a first position adjacent to said second end of said first optical fiber bundle and a second position adjacent to said second end of said second optical fiber bundle, said first camera receiving electromagnetic radiation transmitted by said first optical fiber bundle when located in said first position and receiving electromagnetic radiation transmitted by said second optical fiber bundle when located in said second position.

13. The system of claim 10, wherein said camera palette assembly further comprises a second camera mounted to said fixture, said first camera being movable to a position adjacent to said second end of one of said first and second optical fiber bundles so as to receive electromagnetic radiation transmitted by said one optical fiber bundle, and said second camera being movable to a position adjacent to said second end of the other of said first and second optical fiber bundles so as to receive electromagnetic radiation transmitted by said other optical fiber bundle.

14. The system of claim 10, wherein said first camera is capable of receiving and processing electromagnetic radiation falling within the wavelength range of from about 8 microns to about 12 microns.

15. The system of claim 10, wherein said first camera is capable of receiving and processing electromagnetic radiation falling within the visible wavelength range.

16. The system of claim 15, wherein said first camera comprises a high speed camera.

17. The system of claim 10, wherein said first camera is capable of receiving and processing electromagnetic radiation falling within the near infrared wavelength range.

18. The system of claim 10, wherein said optical fiber bundle comprises a plurality of photonic crystal fibers.

19. The system of claim 10, wherein said optical fiber bundle comprises a plurality of low temperature optical fibers.

20. The system of claim 10, wherein said optical fiber bundle comprises a plurality of sapphire optical fibers.

* * * * *